United States Patent [19]
Vissers et al.

[11] Patent Number: 6,061,996
[45] Date of Patent: May 16, 2000

[54] DEVICE FOR INTRODUCING FILLED FLAT BAGS INTO CARTONS

[75] Inventors: Eugene Vissers, Heeze; Jan Moonen, Stramproy, both of Netherlands; Mike Muehlberg, Schwanlmtal, Germany; Bert Korten, Weert, Netherlands

[73] Assignee: Robert Bosch GmbH, Stuttgart, Germany

[21] Appl. No.: 09/142,756

[22] PCT Filed: Mar. 7, 1997

[86] PCT No.: PCT/DE97/00446

§ 371 Date: Sep. 14, 1998

§ 102(e) Date: Sep. 14, 1998

[87] PCT Pub. No.: WO97/33795

PCT Pub. Date: Sep. 18, 1997

[30] Foreign Application Priority Data

Mar. 14, 1996 [DE] Germany ............................ 196 09 976
Mar. 14, 1996 [DE] Germany ............................ 196 09 974

[51] Int. Cl.⁷ ...................................................... B65B 1/04
[52] U.S. Cl. .................................. 53/244; 53/247; 53/251; 53/540; 198/411

[58] Field of Search ............................... 53/235, 244, 245, 53/247, 249–251, 154, 531, 539, 540; 198/379, 407, 411, 414

[56] References Cited

U.S. PATENT DOCUMENTS

| | | | |
|---|---|---|---|
| 4,660,352 | 4/1987 | Deines et al. | 53/438 |
| 4,776,148 | 10/1988 | Mingozzi | 53/143 |
| 5,044,143 | 9/1991 | Ako et al. | 53/448 |
| 5,605,031 | 2/1997 | Prakken | 53/537 |
| 5,655,355 | 8/1997 | Ramler | 53/475 |
| 5,778,640 | 7/1998 | Prakken et al. | 53/475 |

*Primary Examiner*—Ed Tolan
*Attorney, Agent, or Firm*—Ronald E. Greigg; Edwin E. Greigg

[57] ABSTRACT

A device for introducing items, in particular filled flat bags, into cartons has a bag delivering device, a plurality of feed shunts for transferring one flat bag at a time onto a respective vacuum turntable as well as suction devices each for at least one flat bag. The empty cartons are furnished by means of a delivery belt and a horizontally movable carton positioning belt. According to the invention, it is proposed that a plurality of flat bags be introduced into the cartons simultaneously, with the flat bags each being assigned to certain cartons.

15 Claims, 2 Drawing Sheets

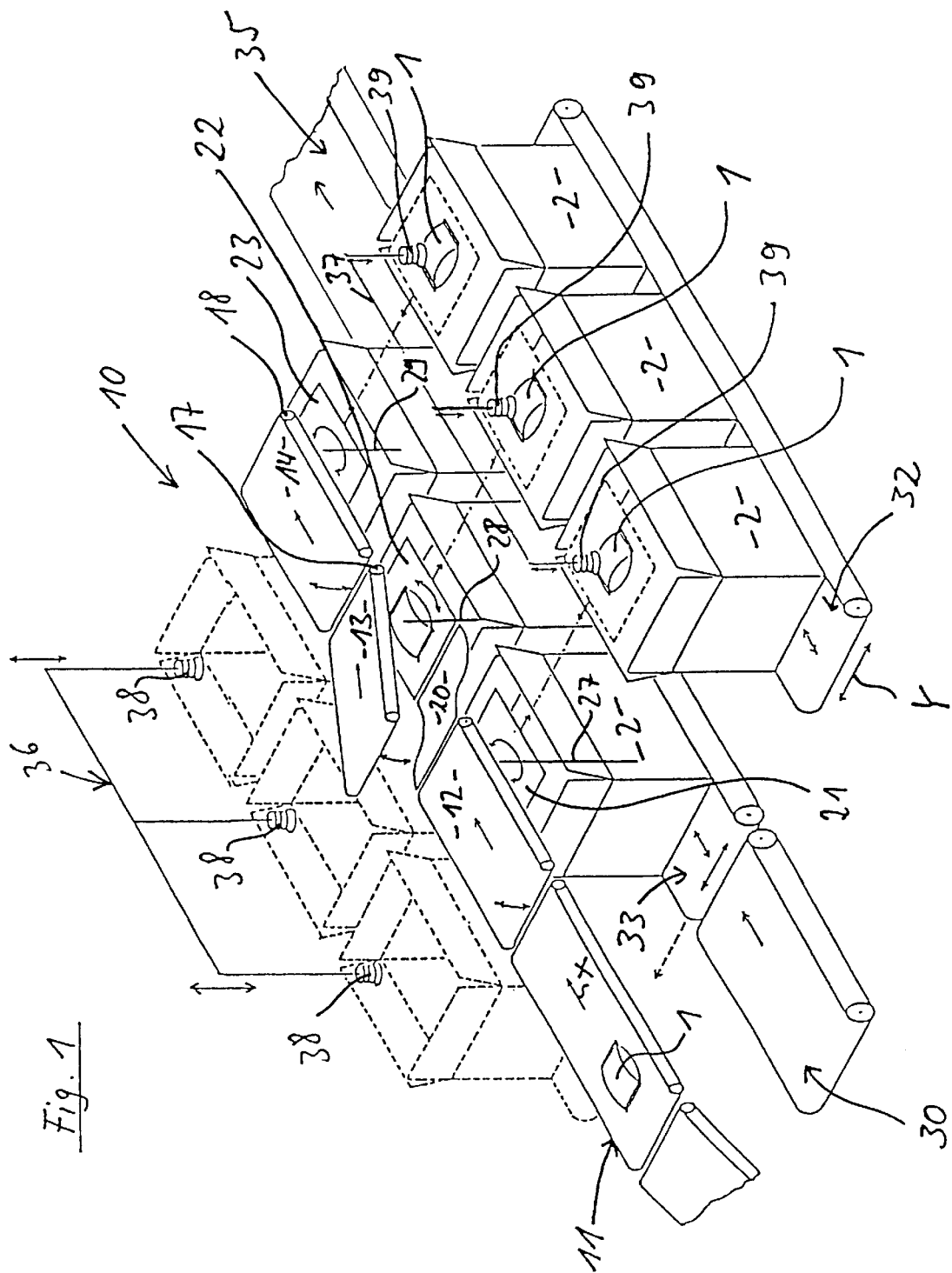

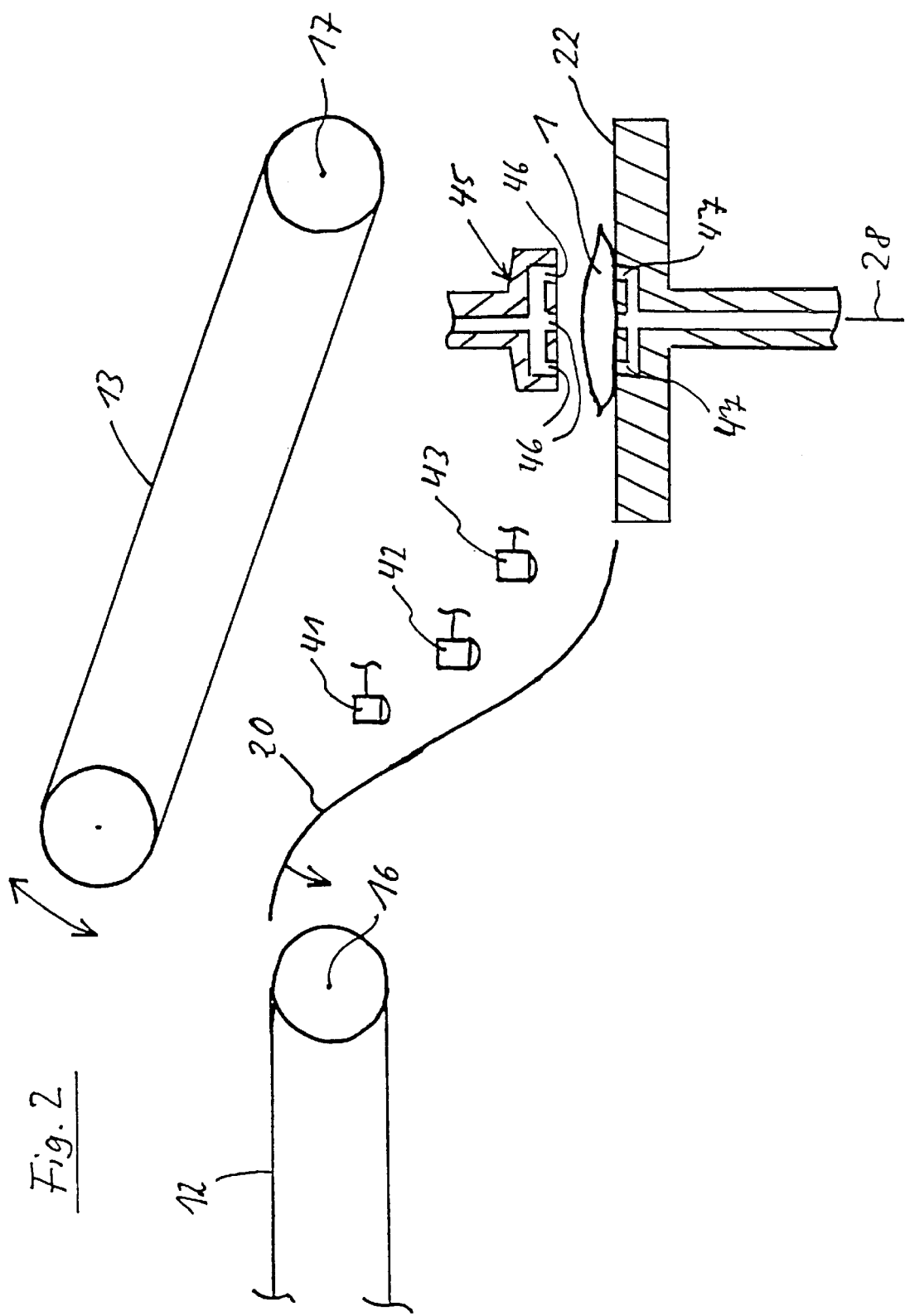

DEVICE FOR INTRODUCING FILLED FLAT BAGS INTO CARTONS

This application is a 35 U.S.C. 371 of PCT/DE97/00446 filed Mar. 7, 1997.

The invention is based on a device for introducing items, in particular filled flat bags, into cartons, of the kind disclosed for instance by French Patent 1 537 812. In the known device, the flat bags pass from a vertically arranged discharge gate device onto a horizontally displaceable, raisable and lowerable conveyor plate that positions the flat bags below a suction head. Once the flat bags have been received from the conveyor plate by means of the suction head, the conveyor plate is retracted, so that the suction head can deposit the flat bags in one of a plurality of cartons arranged on a conveyor belt below the suction head. If a flat bag is to be deposited into a particular carton by means of the known device, it is necessary for the applicable carton to be moved below the suction head by adjustment of the conveyor belt. When a plurality of cartons are located on the conveyor belt, this requires a conveyor belt of complicated design. Moreover, during the adjusting of the conveyor belt, it is as a rule impossible to place any other flat bag into a carton at the same time. The object of the invention is to improve a device for introducing items, in particular filled flat bags, into cartons, in such a way that it prevents the disadvantages in terms of flexibility and capacity known from the prior art for complex applications, and at the same time enables a compact design. Further advantages and advantageous refinements of the device according to the invention for introducing items, in particular filled flat bags, into cartons will become apparent from the the description set forth hereinafter.

BRIEF DESCRIPTION OF THE DRAWINGS

One exemplary embodiment of the invention is shown in the drawing and will be described in further detail below.

FIG. 1 shows a device for introducing items, in particular filled flat bags, in a simplified perspective view; and FIG. 2 shows part of the device of FIG. 1 in a simplified longitudinal section.

The device 10 for introducing items, in particular filled flat bags 1, into cartons 2 has a bag delivery device 11, embodied as a belt conveyor, on which the flat bags 1 are arranged in a line, spaced apart from one another, and delivered to the device 10 in the direction X. In the region of the device 10, the bag delivery device 11 has three successive feed shunts 12, 13, 14. The feed shunts 12, 13, 14, and the bag delivery device 11 together form a common conveying plane. Each of the feed shunts 12, 13, 14 is likewise preferably embodied as a belt conveyor. In addition, each of the feed shunts 12, 13, 14 is pivotable between two end positions, on the side remote from the bag delivery device 11, each being pivoted in a respective horizontally disposed pivot shaft 16, 17, 18. In the first, lowered end position, the feed shunts 12, 13, 14 form one common horizontal conveying plane for incoming flat bags 1. In the other end position, the side of the feed shunts 12, 13, 14 facing toward the bag delivery device 11 is raised by at least a height equivalent to the height of one flat bag 1.

In coincidence with and below the feed shunts 12, 13, 14, each feed shunt 12, 13, 14 is assigned a slide plate 20 and a vacuum turntable 21, 22, 23. For the sake of simplicity, the slide plate 20 is shown in FIG. 1 only below the feed shunt 13, but the other two feed shunts 12, 13 also have identically embodied slide plates 20. The slide plates 20 serve to transfer the flat bags 1 from the plane of the belt delivery device 11 or of the feed shunts 12, 13 to the vacuum turntables 21, 22, 23. The vacuum turntables 21, 22, 23 adjoin the slide plate 20 as gaplessly as possible, and extend parallel to and below the belt delivery device 11. In FIGS. 1 and 2, the slide plate 20 is shown embodied in an S shape. However, it may also be embodied as a flat plate, for example. The vacuum turntables 21, 22, 23 are likewise not restricted to a rectangular shape. What is essential is merely that a transition that as much as possible is without offsets and gaps be attained from the respective slide plate 20 to the respective vacuum turntable 21, 22, 23 for a flat bag 1. In addition, the slide plates 20 and the vacuum turntables 21, 22, 23 are disposed and embodied in such a way that a flat bag 1, solely by its kinetic energy and without any additional drive, reaches its corresponding vacuum turntable 21, 22, 23 by sliding onto it from the plane of the belt delivery device 11 or of the feed shunts 12, 13 and 14.

The vacuum turntables 21, 22, 23 are rotatably supported in shafts 27, 28, 29 at right angles to the feeding plane of the flat bags 1, and they are movable in the horizontal direction, crosswise to the feeding direction X of the flat bags 1, in the direction Y between two end positions. In the first end position, for taking over the flat bags 1, the vacuum turntables 21, 22, 23 are located beneath the feed shunts 12, 13, 14. In the second end position, for transferring the flat bags 1 to the cartons 2, the vacuum turntables 21, 22, 23 are located laterally next to the feed shunts 12, 13, 14 and above the cartons 2.

For delivering the empty cartons 2, a carton delivery belt 30 is provided, for example below and in coincidence with the bag delivery device 11. The carton delivery belt 30 is adjoined, below the feed shunts 12, 13, 14, by two carton positioning belts 32, 33 disposed parallel to one another and movable crosswise to the feeding direction X of the flat bags 1. Both the carton delivery belt 30 and the carton positioning belts 32, 33 are preferably embodied as belt conveyors, each with separate drives. The spacing of the carton delivery belt 30 and the carton positioning belts 32, 33 from the vacuum turntables 21, 22, 23 is at least equivalent to the height of the cartons 2, when the closure tabs of the cartons 2 are open. The length of the carton positioning belts 32, 33 is such that there is space enough on them for a number of cartons 2 that is at least equivalent to the number of vacuum turntables 21, 22, 23, in this exemplary embodiment three cartons. In addition, as will be explained hereinafter, depending on the size of the flat bags 1 a certain displacement path of the cartons 2 must be provided on the carton positioning belts 32, 33.

For removing full cartons 2, a carton discharge belt 33 is disposed in the extension of the carton delivery belt 30. On both sides of the feed shunts 12, 13, 14, the device 10 has two identically embodied bag takeover and dispensing devices 36, 37, each with three vertically movable suction devices 38, 39. Each of the suction devices 38, 39 associated with a discharge device 36, 37 has the same lateral spacing from the feed shunts 12, 13, 14. In addition, in the lateral position of the vacuum turntables 21, 22, 23, the suction devices 38, 39 are aligned with the centers of area of the vacuum turntables 21, 22, 23.

As shown in FIG. 2, three sensors 41, 42, 43, which are connected to the control unit of the device 10, are disposed above the slide plate 20, along the sliding path of the flat bag 1, but below the feed shunt 13. The sensors 41, 42, 43 are preferably embodied as photoelectric gates or photocells, so that when the flat bag 1 moves past the sensor 41, 42, 43, a corresponding signal is generated and supplied to the control unit. A blower head 45 is also disposed between the feed shunt 13 and the vacuum turntable 22; its blow openings 46, oriented toward the vacuum turntable 22, are connected to an overpressure source, not shown. Aligned with the blow openings 46 are suction openings 47, which are embodied in the vacuum turntable 22 and communicate with a negative pressure source, again not shown. The surface area covered by the blow openings 46 and suction openings 47 is adapted to the size of the flat bags 1. In particular, a flat bag 1 has a larger projected area than is the case for the suction openings 47, thus avoiding losses by air leaks at the suction openings 47, since a flat bag 1 resting on the vacuum turntable 22 completely covers the suction openings 47. It is understood that corresponding sensors 41, 42, 43, blower heads 42, and vacuum turntables 21, 23 are disposed below the two feed shunts 12, 14 as well.

The device 10 described above functions as follows: By means of the carton delivery belt 30, three empty cartons 2 are fed to one of the two carton positioning belts 32, 33 arranged for the purpose in alignment with the carton delivery belt 30. Next, the carton positioning belt 32, 33 that has been supplied with the empty cartons 2 moves laterally into the required position below the suction devices 38, 39 for depositing the first flat bags 1, in accordance with an intended placement pattern for the flat bags 1, in the carton 2. Even while the carton positioning belt 32, 33 is moving into this first position, flat bags 1 entering from the bag delivery device 11 are distributed onto the vacuum turntables 21, 22, 23. To achieve the highest possible capacity of the device 10, the first entering flat bag 1 is allocated to the vacuum turntable 23, the second flat bag 1 to the vacuum turntable 22, and the third entering flat bag 1 to the vacuum turntable 21. The transfer of the entering flat bags 1 to the corresponding vacuum turntables 21, 22, 23 from the bag delivery device 11 is effected by correspondingly raising the feed shunts 12, 13, 14 associated with the vacuum turntable 21, 22, 23, while the other feed shunts 12, 13, 14 remain in their lowered end position.

To assure that the flat bags 1 will always reach the proper vacuum turntable 21, 22, 23 and will not already come to a standstill in the region of the slide plates 20, the feeding speed of the flat bags 1 on the bag delivery device 11 or the feed shunts 12, 13, 14 is high enough that the flat bags 1, after sliding onto the slide plates 20, will always reach the vacuum turntable 21, 22, 23 with a certain excess speed. In order to dissipate this excess speed and cause the flat bags 1 to come to a stop at a defined location on the vacuum turntable 21, 22, 23, the speed of the flat bag 1 at the time is calculated by the control unit, from the signals delivered to the control unit from the sensors 41, 42, 43. In accordance with the result of this calculation, the blow openings 46 or suction openings 47 are subjected to compressed air or suction, respectively, so that the flat bag 1 comes to a stop at the desired point on the vacuum turntable 21, 22, 23. By the use of the blower head 45 and its blow openings 46, it is accomplished that the flat bag 1 is pressed down onto the suction openings 47, so that uneven boundary walls of the flat bags 1 will not so easily lead to air leakage losses at the suction openings 47.

As soon as a given flat bag 1 is positioned by negative pressure on the vacuum turntable 21, 22, 23, the vacuum turntables 21, 22, 23 are moved into a position directly below the corresponding suction devices 38, 39. During this motion, the vacuum turntables 21, 22, 23 can be rotated in their vertically arranged shafts 26, 27, 28, in accordance with the pattern in which the flat bags 1 are to be placed in the carton 2. Once the flat bags 1 are in position below the suction devices 38, 39, the suction devices 38, 39 are put into contact with the tops of the flat bags 1; a suitable pressure for holding the flat bags 1 is turned on and then, if needed, there is a motion upward again by some distance, so that the vacuum turntables 21, 22, 23 can be moved back into their position by the feed shunts 12, 13, 14 in order to receive the next flat bags 1. Once the vacuum turntables 21, 22, 23 have been moved back again to below their associated feed shunts 12, 13, 14, the suction devices 38, 39, in order to deposit the flat bags 1 in the carton 2, are moved downward, and the negative pressure of the suction devices 38, 39 is turned off again.

In order to receive the next flat bags 1, the suction devices 38, 39 are moved back into their original, raised position. To enable the subsequent flat bags 1 to be deposited in the cartons 2 in accordance with the intended placement pattern, the respective carton positioning belt 32, 33 is moved into the proper position below the suction devices 38, 39. This is attained on the one hand by a corresponding motion in the direction Y, and on the other by means of the separate drive of the carton positioning belt 32, 33 in the direction X. In order to attain exact positions, both the drive for the rotary motion of the carton positioning belts 32, 33 and the separate drive of the carton positioning belts 32, 33 are preferably embodied with servomotor systems. In the manner described above, three flat bags 1 at a time are placed each in one carton 2, simultaneously. Depending on the size of the flat bags 1 and cartons 2, it is possible for each layer to include a plurality of flat bags 1.

While three cartons 2, located on the one carton positioning belt 32, 33, are being filled with flat bags 1, at the same time the other carton positioning belt 32, 33 is supplied with empty cartons 2 and is then moved into its associated position below the suction devices 38, 39. As soon as the cartons 2 on the one carton positioning belt 32, 33 are completely filled with flat bags 1, the vacuum turntables 21, 22, 23 carrying the next flat bags 1 to the cartons 2 that have been put in place in the meantime are moved to the other of the two carton positioning belts 32, 33. In this way, full flat bags one can be delivered to the device 10 continuously from the bag delivery device 11.

Once the cartons 2 on one carton positioning belt 32, 33 have been completely filled with flat bags 1, the carton positioning belt 32, 33 is moved back below the feed shunts 12, 13, 14 again and positioned in alignment with the bag delivery device 11 or the carton removal belt 35. Next, the full cartons 2 are fed from the carton positioning belt 32, 33 onto the carton removal belt 35, which can deliver the cartons 2 to a downstream carton closing device, not shown.

In addition it will be noted that for detecting defective flat bags 1, a monitoring device may be disposed in the region of the bag delivery device; by way of example, it checks the position and height of the arriving flat bags 1. Any flat bags 1 found to be defective can either be rejected, or their position can be corrected. The rejection of defective flat bags 1 can for instance be done such that a bag remover device is disposed in the extension of the feed shunt 14, and the defective flat bags 1 are fed onto this bag delivery belt via all the feed shunts 12, 13, 14.

To increase the capacity of the device 10, it is conceivable to increase the number of feed shunts, vacuum turntables, carton positioning belts, and suction devices. Thus more flat bags can be placed in the cartons per operating cycle of the device 10. This is also possible if, in a modification of the abovedescribed exemplary embodiment, it is not merely one a single flat bag 1 at a time but rather a plurality of flat bags 1 fed in immediate succession, that can be positioned on one of the vacuum turntables 21, 22, 23. In that case, it is understood that the vacuum turntables 21, 22, 23 and the discharge devices 36, 37 must be adapted (by means of a corresponding number of suction devices 38, 39).

The device may be modified in various ways. For instance, it is conceivable for the carton delivery belt 30 and/or the carton removal belt 35 not to be disposed in coincidence or alignment with the bag delivery device 11 and the feed shunts 12, 13, 14 but rather laterally offset from them. Depending on the application, the carton changing time can thus be shortened and hence the capacity of the device increased. It is also possible, instead of the bag delivery device embodied as a belt conveyor and the feed shunts, to use a drive belt that cooperates with a plurality of pivotal forks. To pick up a flat bag, the forks dip between the individual belts of the drive belt. As soon as a flat bag enters the region above the fork, the fork swings upward. In this position, the forks can be moved laterally to beneath the suction devices, in a matter analogous to the vacuum turntables. However, it is also conceivable to leave the forks stationary and to use horizontally displacable section devices that take over the flat bags from the forks. A rotation device may for instance also be integrated in the suction devices, to enable placing the flat bags taken over from the forks in the correct positions in the cartons.

In a further modification of the device, instead of the feed shunts or the forks, so-called linear distributors, known per se, are used. What is essential for the invention is only that each arriving flat bag be distributed to a separate station or vacuum turntable. As soon as one flat bag has been feed to each of the stations, the flat bags are all taken over simultaneously by a plurality of suction devices, and all the flat bags are simultaneously placed each in a separate carton.

It is naturally also possible to use the described device 10 not merely for introducing filled flat bags 1 into cartons 2. On the contrary, the most various items can be introduced into cartons 2 by means of the device 10, examples being boxes, blister packs, or other dimensionally stable products.

The foregoing relates to a preferred exemplary embodiment of the invention, it being understood that other variants and embodiments thereof are possible within the spirit and scope of the invention, the latter being defined by the appended claims.

What is claimed is:

1. A device (10) for introducing items into cartons (2), comprimising a first conveyor device (11) that feeds the items in a line to intermediate storage elements (21, 22, 23) positioned below said first conveyor device (11), at least one intermediate storage element (21, 22, 23) for receiving at least one item, said at least one storage element is movable to a position beneath a vertically movable suction device (38, 39), the suction device (38, 39) being disposed in alignment with the carton (2) to be filled, at least one shunt element (12, 13, 14) that cooperates with the first conveyor device is movable between two positions; in a first position of the shunt element (12, 13, 14), at least one item at a time is delivered by the first conveyor device (11) to a first intermediate storage element (12, 13, 14), in said second position the shunt element carries at least one item at a time in sequence to a second intermediate storage element (21, 22, 23), and a third suction device (38, 39) is disposed in alignment with a third carton (2) to be filled, and the intermediate storage element (21, 22, 23) is rotatable about a shaft (27, 28, 29) that is disposed vertically to a feeding direction (X) of the items.

2. The device of claim 1, in which the cartons (2) are disposed on at least a second conveyor device (32, 33), which is disposed movably crosswise to a feeding direction (X) of the items.

3. The device of claim 1, in which the cartons (2) are disposed on at least a second conveyor device (32, 33), which is disposed movably crosswise to the feeding direction (X) of the items.

4. The device of claim 1, in which a delivery conveyor belt (30) for empty cartons (2) is disposed below the first conveyor device (11) for the items.

5. The device of claim 1, in which a delivery conveyor belt (30) for empty cartons (2) is disposed below the first conveyor device (11) for the items.

6. The device of claim 1, in which suction openings (47) communicating with a source of negative pressure are embodied in each intermediate storage element (21, 22, 23), and/or blow openings (46) communicating with a source of overpressure are embodied above each intermediate storage element (21, 22, 23), in order to stop and hold the items.

7. The device of claim 6, in which the suction openings (47) and/or the blow openings (46) cooperate with at least one sensor (41, 42, 43) disposed in a region of the associated transfer element (20); and that the suction openings (47) and/or the blow openings (46) can be triggered by a control unit in accordance with a signal of at least one sensor (41).

8. A device (10) for introducing items into cartons (2), comprising a first conveyor device (11) that feeds the items in a line to intermediate storage elements (21, 22, 23) positioned below said first conveyor device (11), at least one intermediate storage element (21, 22, 23) for receiving at least one item, said at least one storage element is movable to a position beneath a vertically movable suction device (38, 39), the suction device (38, 39) being disposed in alignment with the carton (2) to be filled, at least one shunt element (12, 13, 14) that cooperates with the first conveyor device is movable between two positions; in a first position of the shunt element (12, 13, 14), at least one item at a time is delivered by the first conveyor device (11) to a first intermediate storage element (12, 13, 14), in said second position the shunt element carries at least one item at a time in sequence to a second intermediate storage element (21, 22, 23), and a third suction device (38, 39) is disposed in alignment with a third carton (2) to be filled and the shunt element (12, 13, 14) is supported pivotably about a horizontal shaft (16, 17, 18) and is disposed above the first intermediate storage element (21, 22, 23) in the extension of the first conveyor device (11) and disposed between the first conveyor device (11) and the intermediate storage element (21) and the following intermediate storage element (21) or the shunt element (12, 13, 14) and the intermediate storage element (22, 23) is a transfer element (20), which when the shunt element (12, 13, 14) is pivoted into the first position, at least one item at a time is transferred from the first conveyor device (11) or a shunt element (12, 13, 14) onto the corresponding intermediate storage element (21, 22, 23).

9. The device of claim 8, in which the intermediate storage element (21, 22, 23) is rotatable about a shaft (27, 28, 29) that is disposed vertically to the feeding direction (X) of the items.

10. The device of claim 8, in which the cartons (2) are disposed on at least a second conveyor device (32, 33), which is disposed movably crosswise to the feeding direction (X) of the items.

11. The device of claim 8, in which a delivery conveyor belt (30) for empty cartons (2) is disposed below the first conveyor device (11) for the items.

12. A device (10) for introducing items into cartons (2), comprimising a first conveyor device (11) that feeds the items in a line to intermediate storage elements (21, 22, 23) positioned below said first conveyor device (11), and at least on intermediate storage element (21, 22, 23) for receiving at least one item, said at least one storage element is movable to a position beneath a vertically movable suction device (38, 39), the suction device (38, 39) being disposed in alignment with the carton (2) to be filled, at least one shunt element (12, 13, 14) that cooperates with the first conveyor device is movable between two positions; in a first position of the shunt element (12, 13, 14) at least one item at a time is delivered by the first conveyor device (11) to a first intermediate storage element (12, 13, 14), in said second position the shunt element carries at least one item at a time in sequence to a second intermediate storage element (21, 22, 23), and a third suction device (38, 39) is disposed in alignment with a third carton to be filled, the shunt element (12, 13, 14) is supported pivotably about a horizontal shaft (16, 17, 18) and is disposed above the first intermediate storage element (21, 22, 23) in the extension of the first conveyor device (11), and the intermediate storage element (21, 22, 23) is rotatable about a shaft (27, 28, 29) that is disposed vertically to the feeding direction (X) of the items.

13. A device (10) for introducing items into cartons (2), comprising a first conveyor device (11) that feeds the items in a line to intermediate storage elements (21, 22, 23) positioned below said first conveyor device (11), at least one intermediate storage element for receiving at least one item, said at least one storage element is movable to a position beneath a vertically movable suction device (38, 39), the suction device (38, 39) being disposed in alignment with the carton (2) to be filled, at least one shunt element (12, 13, 14) that cooperates with the first conveyor device is movable between two positions; in a first position of the shunt element (12, 13, 14) at least one item at a time is delivered by the first conveyor device (11) to a first intermediate storage element (12, 13, 14), in said second position the shunt element carries at least one item at a time in sequence to a second intermediate storage element (21, 22, 23) and a third suction device (38, 39) is disposed in alignment with a third carton to be filled, the cartons (2) are disposed on at least a second conveyor device (32, 33), which is disposed movably crosswise to the feeding direction (X) of the cartons, and each of the second conveyor devices (32, 33) for the empty cartons (2) cooperates each with a separate transfer device (36, 37).

14. The device of claim 13, in which the second conveyor device (32, 33) has a separate drive mechanism in order to vary the deposited position of the items in the carton (2) and to deliver cartons (2) onto the second conveyor device (32, 33) and remove them from the second conveyor device.

15. A device (10) for introducing items into cartons (2), comprising a first conveyor device (11) that feeds the items in a line to intermediate storage elements (21, 22, 23) positioned below said first conveyor device (11), at least one intermediate storage element (21, 22, 23) for receiving at least one item, said at least one storage element is movable to a position beneath a vertically movable suction device (38, 39), the suction device (38, 39) being disposed in alignment with the carton (2) to be filled, at least one shunt element (12, 13, 14) that cooperates with the first conveyor device is movable between two positions; in a first position of the shunt element (12, 13, 14), at least one item at a time is delivered by the first conveyor device (11) to a first intermediate storage element (12, 13, 14), in said second position the shunt element carries at least one item at a time in sequence to a second intermediate storage element (21,22, 23), and a third suction device (38, 39) is disposed in alignment with a third carton (2) to be filled, a delivery conveyor belt (30) for empty cartons (2) is disposed below the first conveyor device (11), and each of the second conveyor devices (32, 33) for the empty cartons (2) cooperates each with a separate transfer device (36, 37) for the flat bags (1).

* * * * *